United States Patent

[11] 3,619,612

[72] Inventors William H. Belke
Peoria;
William E. Dearlove, Washington both of Ill.
[21] Appl. No. 878,107
[22] Filed Nov. 19, 1969
[45] Patented Nov. 9, 1971
[73] Assignee Caterpillar Tractor Co.
Peoria, Ill.

[54] MONITORING DEVICE FOR ROTATING SYSTEMS
7 Claims, 4 Drawing Figs.
[52] U.S. Cl. .................................................. 250/83.3 H,
73/136 A, 250/212, 340/189, 340/190
[51] Int. Cl. ........................................................ H01j 39/12

[50] Field of Search .................................... 250/83.3 H,
83, 212; 340/189 X, 190 X, 210; 73/136 A

[56] References Cited
UNITED STATES PATENTS
3,005,862 10/1961 Escoffery ................. 250/83.3 H UX
3,336,795 8/1967 Arakawa ..................... 73/136 A
3,436,540 4/1969 Lamorlette ................. 250/83.3 H

*Primary Examiner*—James W. Lawrence
*Assistant Examiner*—Morton J. Frome
*Attorney*—Fryer, Tjensvold, Feix, Phillips & Lempio ABSTRACT: A system for measuring physical properties of rotating devices and transmitting the measurements from the rotating member to an unconnected stationary circuit by means of electromagnetic waves having a frequency above $3 \times 10^{12}$ Hz.

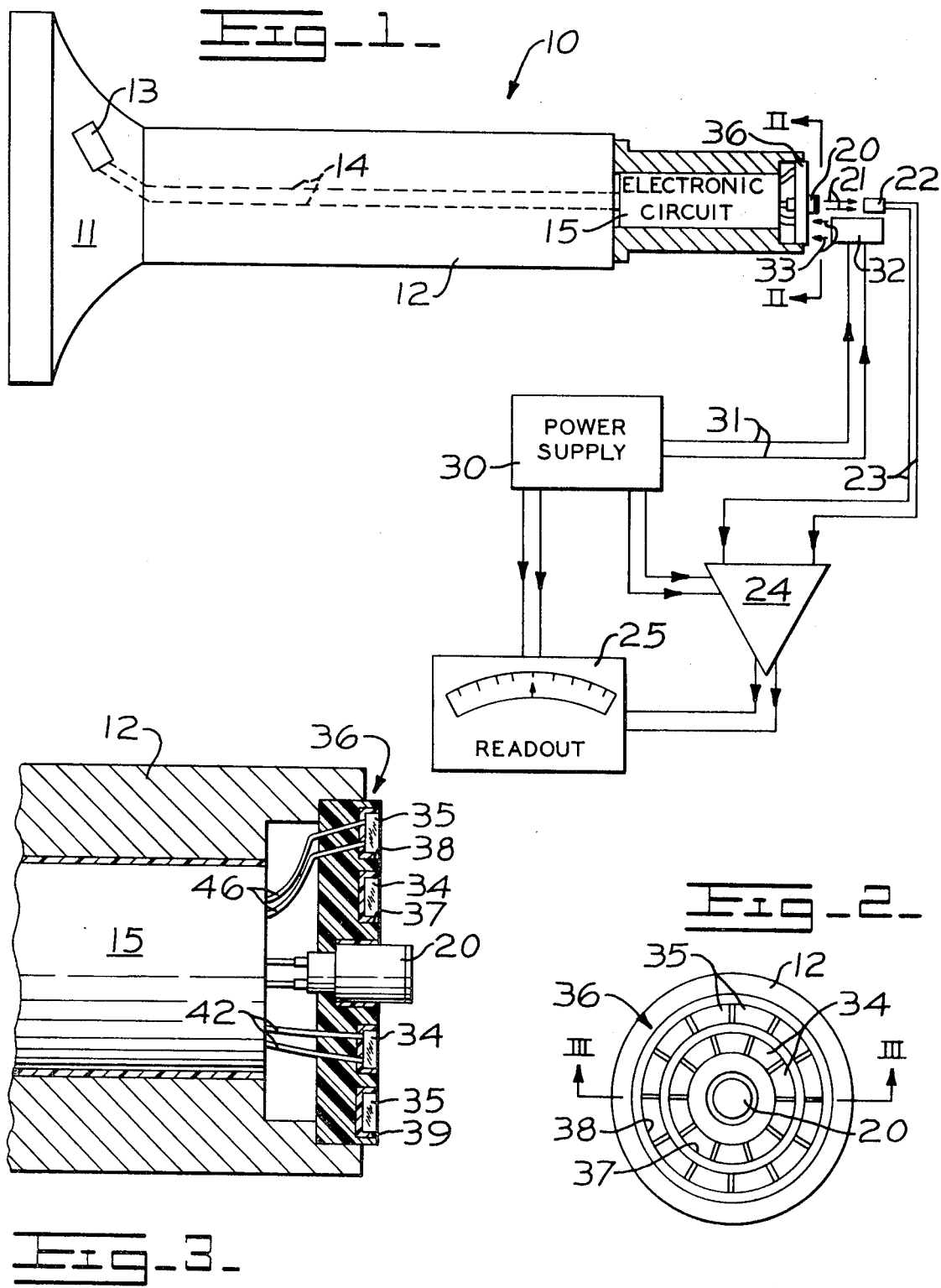

MONITORING DEVICE FOR ROTATING SYSTEMS

BACKGROUND OF THE INVENTION

The present invention relates to measuring systems and particularly systems for measuring a physical property of a rotating device and transmitting the measurement signal representative of the physical property to a stationary recording or display means. Measuring physical properties in all rotating equipment is a problem where usable information relating to the condition of the rotating part monitored is desired, as for example, vibrations, temperature, stresses and the like. While it is possible to obtain such information by physical electrical connection between a sensing system on the rotating device and the external stationary instrumentation for recording or displaying the information, it is difficult and costly in many situations. Sometimes it is not possible. This problem is compounded in the case of very high-speed rotating devices since conventional means such as sliprings are not satisfactory.

In high-speed rotating devices it is impossible to use sliprings since the rotational speed causes extremely fast wear of the brushes and high noise-to-signal level which renders them unsuitable for this service. Even in the case of rotating devices within the nominal speed range capabilities of sliprings the brushes cause signal noise, are subject to mechanical failure, and in some cases cause signal attenuation.

In an attempt to overcome the various shortcomings of mechanical brush or slipring arrangements, other techniques have been devised. One such technique involves a modified slipring using liquid to replace the brush contact for transmitting the signal information from the rotating device to the stationary external instrumentation. While the use of liquid brushes solves the problem of wear caused by high rotating speeds, they still require the sophisticated mounting of the necessary equipment of the rotating part and complicated structures for the containment of the liquid. Further, the liquid-type sliprings suffer the same problems of noise and a more severe signal attenuation than occurs in mechanical brush slipring arrangements.

Another method employs what is known as a noncontacting type of slipring which usually comprises a rotating transformer. While rotating transformers solve some of the problems that occur with either mechanical brush arrangements or liquid brush arrangements, they are also troubled by signal attenuation. In addition they must have considerable electrical power to function properly often necessitating connection of electrical leads. Further, the rotating transformers can induce serious signal distortions since they rely upon the transmission of the electromagnetic energy across the airgap between the rotating and the stationary parts of the transformer for transmitting data which can be influenced by adjacent magnetic materials.

It is the object of the present invention to solve the above problems by utilizing electromagnetic or light radiation having a frequency above the radiofrequency range for transmitting the data from the rotating device across a gap to the stationary instrumentation, which electromagnetic radiation used has a frequency in the infrared spectrum wherein the lower limit of the spectrum is approximately $3\times10^{12}$ Hz.

SUMMARY OF THE INVENTION

The monitoring system of the present invention provides means for measuring a physical property in the rotating device by converting it to related electrical signal wherein the magnitude of the electrical signal is related to the magnitude of the measured physical property and the electrical signal is used to actuate light-emitting transmission means mounted on the rotating device to generate electromagnetic radiation of a frequency of at least $3\times10^{12}$ Hz. whose magnitude is related to the electrical signal that is sensed by a spaced-apart nonrotating detector or receiving means. A semiconductor diode capable of emitting infrared radiation can be used as a transmitting device. For example, a gallium-arsenide diode may be used.

The electromagnetic radiation transmitted by the diode is received by a stationary receiving means which is capable of quantitatively detecting the electromagnetic radiation by employing a device commonly referred to as a solar cell or photocell. The signal is transmitted to the recording and/or display apparatus where its amplitude can be recorded or displayed for observation.

Also included in the invention is a unique means not requiring physical connections for transmitting energy to the rotating device to power the sensing means, the electronic components and the semiconductor diode transmitting means. This power transmission means comprises a plurality of photocells which are mounted on the rotating device and a stationary source of electromagnetic radiation beamed thereon. Thus, the photo or solar cells receive the electromagnetic radiation and convert it to electrical energy which can then be used to power all the components on the rotating device.

Mounting means for securely mounting the components on the rotating device so that they will not be dislodged regardless of the speed of rotation are also included in the invention. The transmission diode and the solar cells are mounted in annular recesses formed in a disc of rigid synthetic insulation which is fitted in a counterbore in the end of the shaft of the rotating system and retained by means of a suitable bonding agent. The devices can be bonded in the annular grooves by means of epoxy resin. Through the combination of the epoxy resin to bond the devices and the retention supplied by annular grooves the arrangement insures that they will not be dislodged due to very high rotational speeds of the shaft. Similarly, the various sensing devices and their related circuits can also be bonded to the rotating device by means of epoxy resins.

BRIEF DESCRIPTION OF THE DRAWING

The present invention will be more easily understood from the following detailed description of a preferred embodiment when taken in conjunction with the attached drawings in which:

FIG. 1 is an elevation view of the rotating device showing the measuring system thereon;

FIG. 2 is an end view of the rotating device shown in FIG. 1;

FIG. 3 is a partial section of the rotating device shown in FIG. 1 drawn to an enlarged scale; and, FIG. 4 is a schematic circuit diagram of the measuring system.

DESCRIPTION OF THE PREFERRED EMBODIMENT

Figure 4:
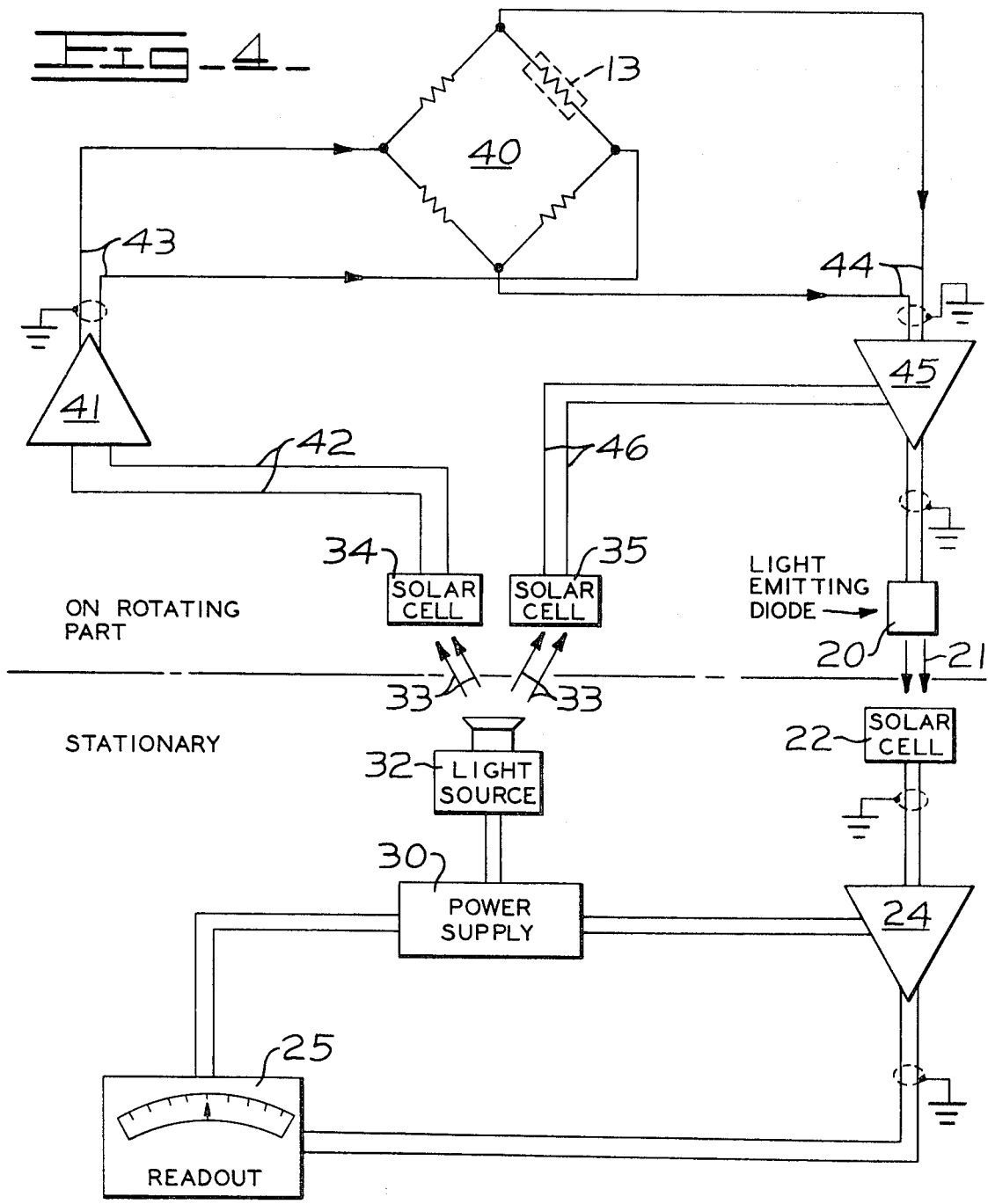

Referring to FIG. 1, a rotating device is shown with the measuring system of the present invention mounted thereon. More particularly, the rotating device 10 is illustrated as being turbine impeller 11 mounted on the end of a shaft 12 with appropriate bearings (not shown) for supporting the shaft. The monitoring system of the present invention consists of a sensor 13 which is coupled by means of leads 14 to the microelectronic circuits 15 mounted in the end of the shaft. While the electronic circuits are shown as being internally mounted in a recess formed in the shaft, they alternatively can be bonded directly to the surface of the shaft when miniature integrated circuits are used. Of course, various factors such as speed of rotation and the permissible unbalance of the shaft will determine whether it is possible to bond the electronic circuits directly on the surface of the shaft or whether it is necessary to mount them in recesses formed in the center of the rotating shaft.

The electronic circuit 15 is coupled to a transmission device or transmitter 20 which converts the electrical signals from the circuit to electromagnetic radiation such that the magnitude of the radiation is related directly to the magnitude of the electrical signals. The transmitter 20 is preferably a semiconductor diode, such as a gallium-arsenide diode, that is capable of generating electromagnetic radiation in response to electrical signals supplied by the electronic circuit, the intensity of which is proportional to the signal. Electromagnetic radiated waves 21 impinge upon a detector 22 (preferably photocells or solar cells) which is capable of converting these waves to a related electrical signal. Again the electrical signal is related directly to the amplitude or magnitude of the electromagnetic radiation received.

The detector 22 is coupled by means of leads 23 to a power amplifier 24 with its output being supplied to a readout means or recorded 25. While the recorder is shown as a simple meter indicating the magnitude of the electrical signal, and thus the magnitude of the measurement of the physical property of the rotating device when calibrated, it obviously can be a recorder providing a continuous and permanent record of the measurement.

The whole system can be powered from a power supply 30 which also supplies power for the electronic circuits 15 mounted in the rotating shaft 12. More particularly, the power supply is coupled by means of leads 31 to a generator of electromagnetic radiation 32. The generator can be a suitable infrared light source, including filters for removing all radiation except the infrared spectrum. The resulting electromagnetic radiation waves 33 impinge upon a plurality of solar cells 34 and 35 mounted in the grooves of disc 36 which is bonded in the end of the shaft of the rotating device. These cells also may be conventional photocells that are responsive to the particular wavelength of the electromagnetic radiation used. The banks of solar cells are coupled by means of suitable leads to the electronic circuit and the other devices on the rotating member that require electrical power. Simple shielding may be used to prevent interference between waves 33 and 21.

Referring specifically to FIGS. 2 and 3, there is shown a detailed mounting for the solar cells 34 and 35 and the transmitting diode 20 in the end of the shaft. The plurality of solar cells 34 and 35 are disposed in concentric annular grooves 37 and 38 formed in the disc 36 and are bonded in the grooves by means of a bonding or adhesive material 39, such as epoxy. The use of a bonding substance serves the dual purpose of bonding the solar cells to the walls of the annular grooves as well as filling the voids between adjacent solar cells and providing insulation. The walls of the annular groove in combination with the bonding agent prevents the solar cells from shifting or being dislodged by centrifugal forces occurring at high-speed rotation velocities of the shaft. As shown in FIGS. 2 and 3, the diode means 20 is mounted in the center of the disc 36 in a recess formed therein by means of a similar bonding agent.

Referring to FIG. 4, a schematic circuit diagram is shown for the device illustrated in FIG. 1. More particularly, the sensor 13 is illustrated as being a strain gauge which is bonded to the impeller to measure the strain generated therein from rotational forces. Other measuring devices that produce or modify electrical signals representing the magnitude of a measurement may also be used. The strain gauge forms one leg of a conventional bridge circuit 40 with the bridge circuit 40 being powered from an oscillator-amplifier 41 which receives power from the solar cells 34. These solar cells are coupled to the amplifier by means of leads 42 while the amplifier in turn is coupled to the bridge circuit by means of the leads 43. The power amplifier can be a conventional amplifier such as commonly used for powering a bridge circuit and may include oscillator circuits for supplying alternating signals to the bridge. The output signal from the bridge is supplied by means of leads 44 to a power amplifier 45 with the electrical power to the amplifier 45 being powered by the solar cells 35 which are coupled to the amplifier by means of leads 46. This power amplifier also can be a conventional amplifier which is capable of amplifying the output signal from the bridge and driving the semiconductor diode means 20 proportional thereto.

The circuit shown in FIG. 4 is the same as that described above with relation to FIG. 1 wherein the signal from the light-emitting diode 20 is detected by the solar cell 22 and displayed on the readout device 25. Of course, the amplifier 24 should include circuits for converting the detected signal to a form that can be displayed when a visual presentation is desired. In some cases it may be desirable to convert the signals to a form for recording, such as digital signals.

OPERATION OF THE PREFERRED EMBODIMENT

The system is operated by first installing the sensing devices on the rotating member. In the case of strain gauges or thermocouples, they can be bonded directly to the rotating member. Other sensing devices may require the forming of recesses in the rotating member and then bonding the device in the recess. Regardless of how the device is mounted care should be exercised so as not to interfere with the dynamic operation of the rotating member or change its balance.

The sensing device is then connected to the required electronic circuits 15 that convert the measurement of the electrical signal to a corresponding signal for powering the semiconductor diode 20. While only a single diode is shown, additional diodes could be used when multiple signals are transmitted. Also, the signals could be multiplexed so that only a single signal is being transmitted at a given interval. The transmitted energy is detected by the solar cell 22 and then displayed or recorded after suitable amplification. In the case of multiplexed signals they can be resolved and the individual signals displayed. When a plurality of diodes are used to transmit a plurality of measurements, they also can be arranged in radially spaced positions at the end of the shaft and the detecting solar cells arranged in a similar manner.

The power for the sensing devices and related electronic circuits can also be supplied by batteries mounted in the rotating member. However, in the case of high-speed rotating members, it is desirable to supply power by means of solar cells or photoconductors mounted on the rotating member and energized from a stationary external light source. The use of powering solar cells eliminates the need for large spaces or areas in the shaft for mounting batteries. Solar cells also lessen balance problems resulting from the use of heavy batteries.

While the invention has been described with reference to infrared radiation it will operate with any light radiation provided it includes some radiation capable of exciting the solar cells or photoconductors. As explained, normally the radiation will have a frequency above $3 \times 10^{12}$ Hz. or above the radiofrequency range.

We claim:

1. A monitoring device for rotating systems not requiring a physical connection to a rotating part being monitored comprising:

sensing means disposed in the rotating part of the system to monitor a physical property thereof, said sensing means generating a first electrical signal proportional to said physical property monitored;

electronic circuits disposed in said rotating part coupled to receive said first electrical signal and providing an output signal proportional thereto;

a light-emitting diode disposed in said rotating part and coupled to said electronic circuits capable of varying the intensity of its electromagnetic radiation in response to said output signal, said radiation having a frequency of at least $3 \times 10^{12}$ Hz.

stationary radiation detecting means mounted to intercept said radiation from said light-emitting diode with circuits to convert it to a second electrical signal; and circuit means coupled to said stationary radiation detecting means for indicating the magnitude of said second electrical signal without a physical connection to said first signal.

2. The monitoring device of claim 1 wherein said stationary detecting means comprises a solar cell disposed in close proximity to said light-emitting diode and oriented to intercept its infrared radiation.

3. The monitoring device of claim 1 wherein said sensing means comprises a strain gauge mounted on the rotating device, said strain gauge forming one leg of a bridge circuit connected to the electronic circuits.

4. The monitoring device of claim 1 wherein the rotating part includes an electrical power supply, said power supply comprising a plurality of solar cells mounted on said rotating part and an adjacent stationary source of electromagnetic radiation disposed to focus electromagnetic radiation on said solar cells to generate electrical energy without interference with emissions of the light-emitting diode.

5. The monitoring device of claim 4 wherein said rotating part includes a shaft end with an annular grooved disc bonded in a counterbore in said shaft end, said solar cells being disposed in said annular grooves with bonding means for filling the voids between adjacent solar cells and bonding them to the walls of said grooves.

6. The monitoring device of claim 5 wherein the light-emitting diode is mounted concentrically in the shaft end.

7. The measurement device of claim 6 wherein the diode is a gallium-arsenide diode.

* * * * *